Figure 1:
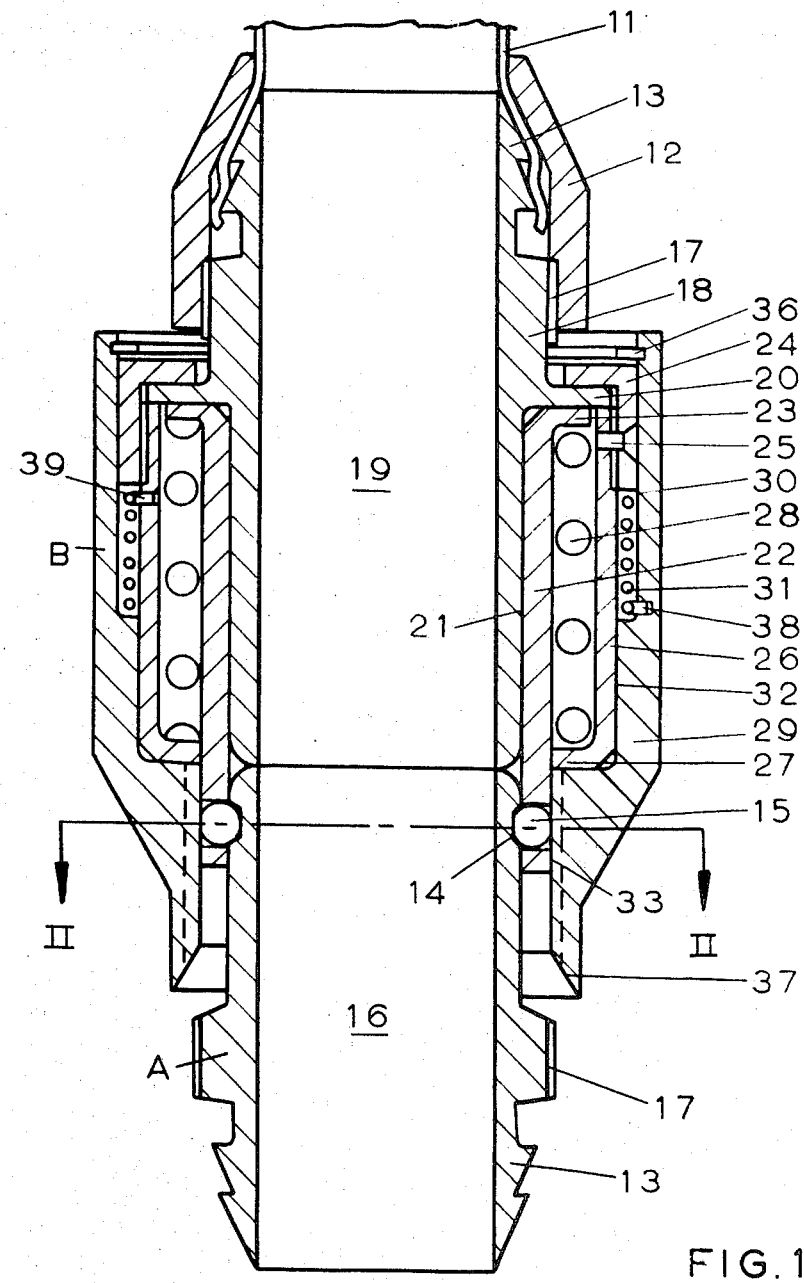

United States Patent [19]
Locke et al.

[11] 3,781,039
[45] Dec. 25, 1973

[54] COUPLINGS

[75] Inventors: Walter Frederick Locke, Emsworth; Ernest Arthur Watson, Bedhampton; Thomas Philip Edwards, Farehem, all of England

[73] Assignee: F.P.T. Industries Limited, Portsmouth, Hampshire, England

[22] Filed: Aug. 2, 1971

[21] Appl. No.: 168,206

[30] Foreign Application Priority Data
Aug. 12, 1970 Great Britain.................. 38,776/70

[52] U.S. Cl.................. 285/1, 137/614, 251/149.6, 285/277, 285/314, 339/91 B
[51] Int. Cl........................... F16l 37/00, F17d 1/00
[58] Field of Search...................... 251/149.6, 149.8, 251/149.1; 285/1, 314, 316, 277; 137/614.02, 614.03, 614.04, 614.05, 614.06; 339/91 B

[56] References Cited
UNITED STATES PATENTS

| | | |
|---|---|---|
| 3,076,671 | 2/1963 | Freeman..................... 137/614.04 X |
| 2,854,259 | 9/1958 | Clark............................ 137/614.03 |
| 3,224,728 | 12/1965 | Buseth et al.............. 137/614.03 X |
| 3,097,867 | 7/1963 | Saloum...................... 137/614.03 X |
| 2,850,298 | 9/1958 | Clark............................. 137/614.03 |
| 3,678,439 | 7/1972 | Vetter........................... 285/316 X |
| 3,537,478 | 11/1970 | Evans et al. ........................ 285/1 X |
| 2,709,093 | 5/1955 | Zeeb...................................... 285/1 |
| 2,463,326 | 3/1949 | Shisko et al. ........................ 285/1 X |
| 3,170,667 | 2/1965 | Szohatsky........................ 251/149.6 |

Primary Examiner—Samuel Scott
Assistant Examiner—Ira S. Lazarus
Attorney—Larson et al.

[57] ABSTRACT

A coupling which will automatically disconnect when subjected to an axial load of more than a predetermined amount.

The coupling may be connected or disconnected manually by either a turning or a sliding movement of an external sleeve, this manual operation being separate from the automatic disconnection.

2 Claims, 7 Drawing Figures

COUPLINGS

This invention relates to a coupling for joining units such as pipes, tanks, electrical cables or the like. More particularly it relates to a coupling which separates automatically when an axial tension in the coupling exceeds a predetermined value.

According to the invention, we provide a coupling for joining two units, the coupling including a first part and a second part attached respectfully to the units to be joined, each part having a bore arranged to provide a path from one unit to the other unit, the first part and the second part being retained in coupled relationship by detents held captive within the second part and urged, in the coupled position, radially inwards into at least one recess on the external surface of the first part by a sleeve carried by and capable of movement on the second part, wherein the sleeve is arranged for movement on the second part against a first, compression, spring and against a second, torsion, spring for, respectively, automatic uncoupling on axial overload and manual uncoupling. The first mode of movement is axial against the first, compression, spring, and the second mode of movement is rotational against the second, torsion, spring.

The coupling may be used to join two fluid pipes or a pipe to a fluid container and each part of the coupling may have a valve which closes the bore of that part automatically when the parts of the coupling separate. Alternatively, the units being joined may be electrical conductors.

Figure 2:
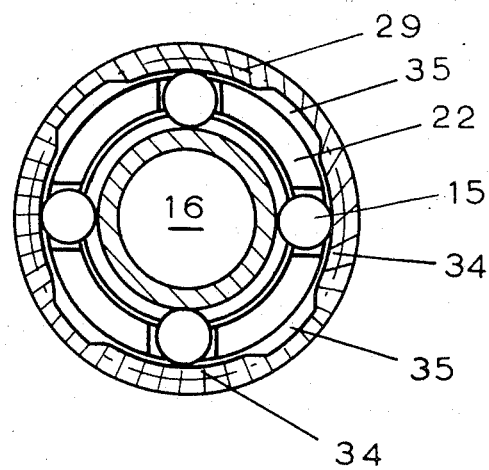
Figure 3:
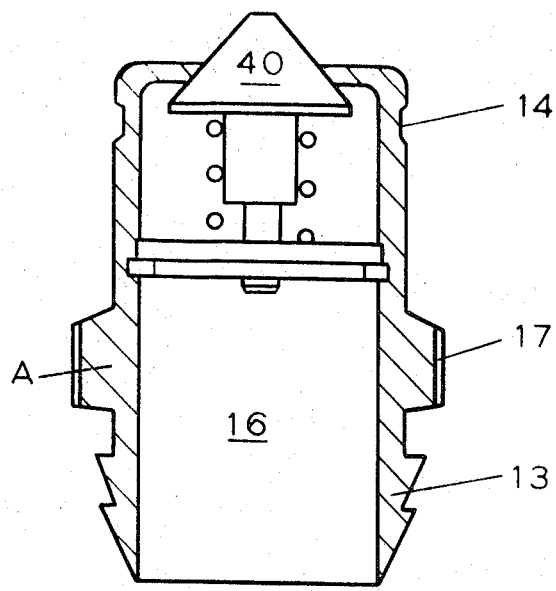
Figure 4:
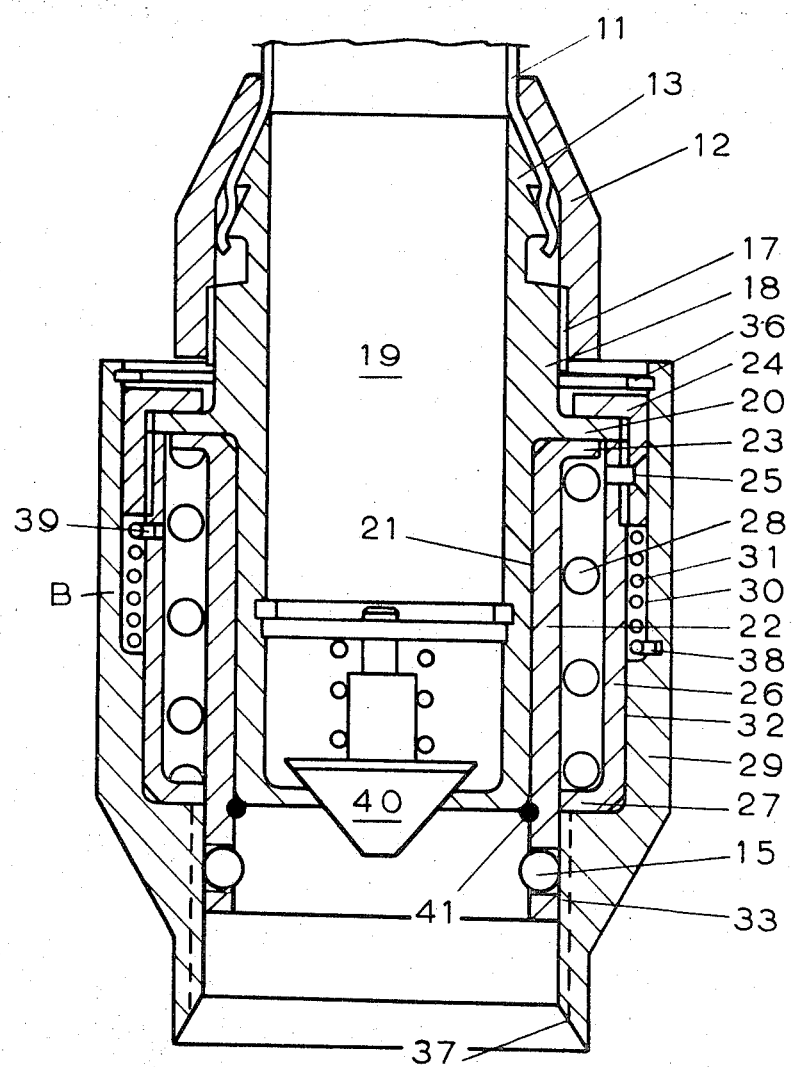
Figure 5:
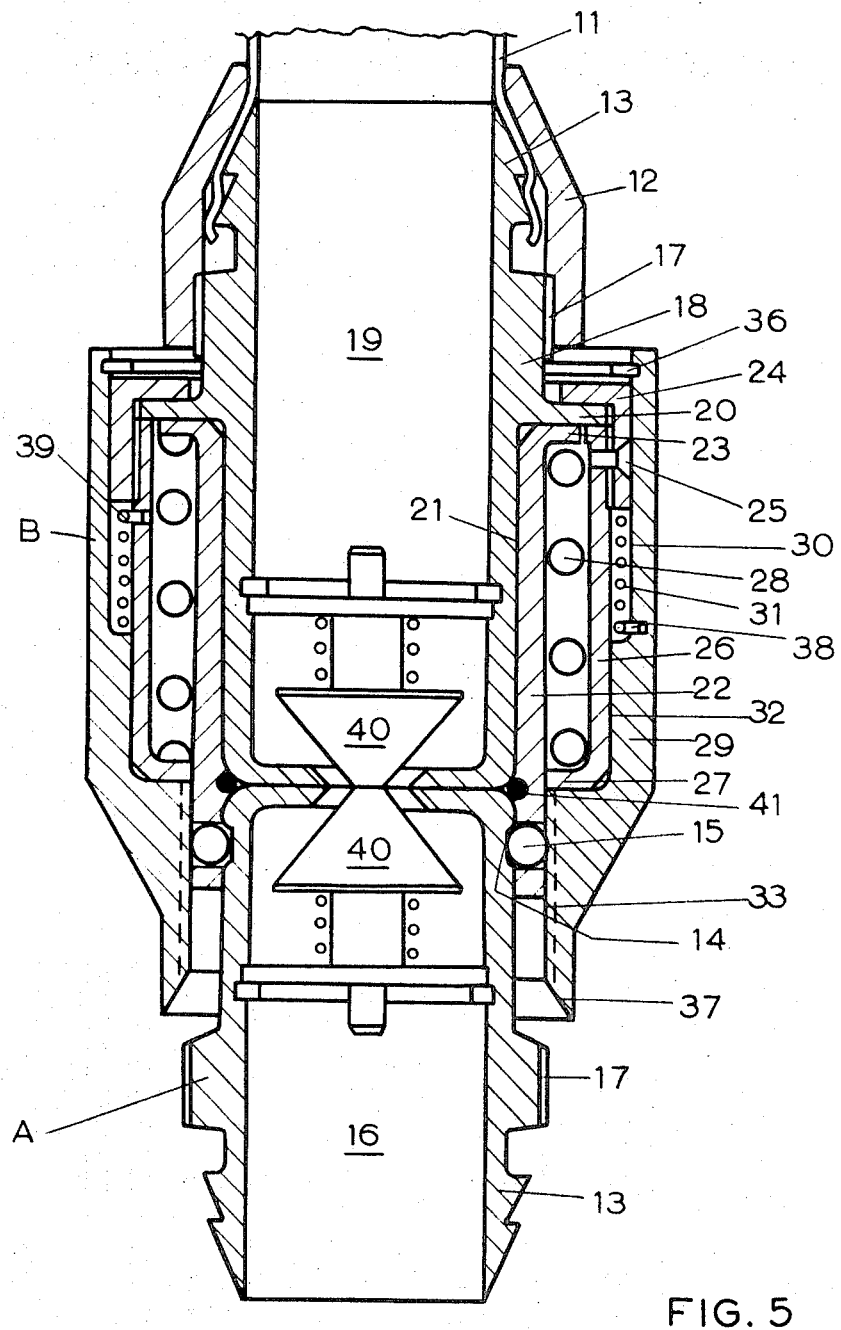
Figure 6:
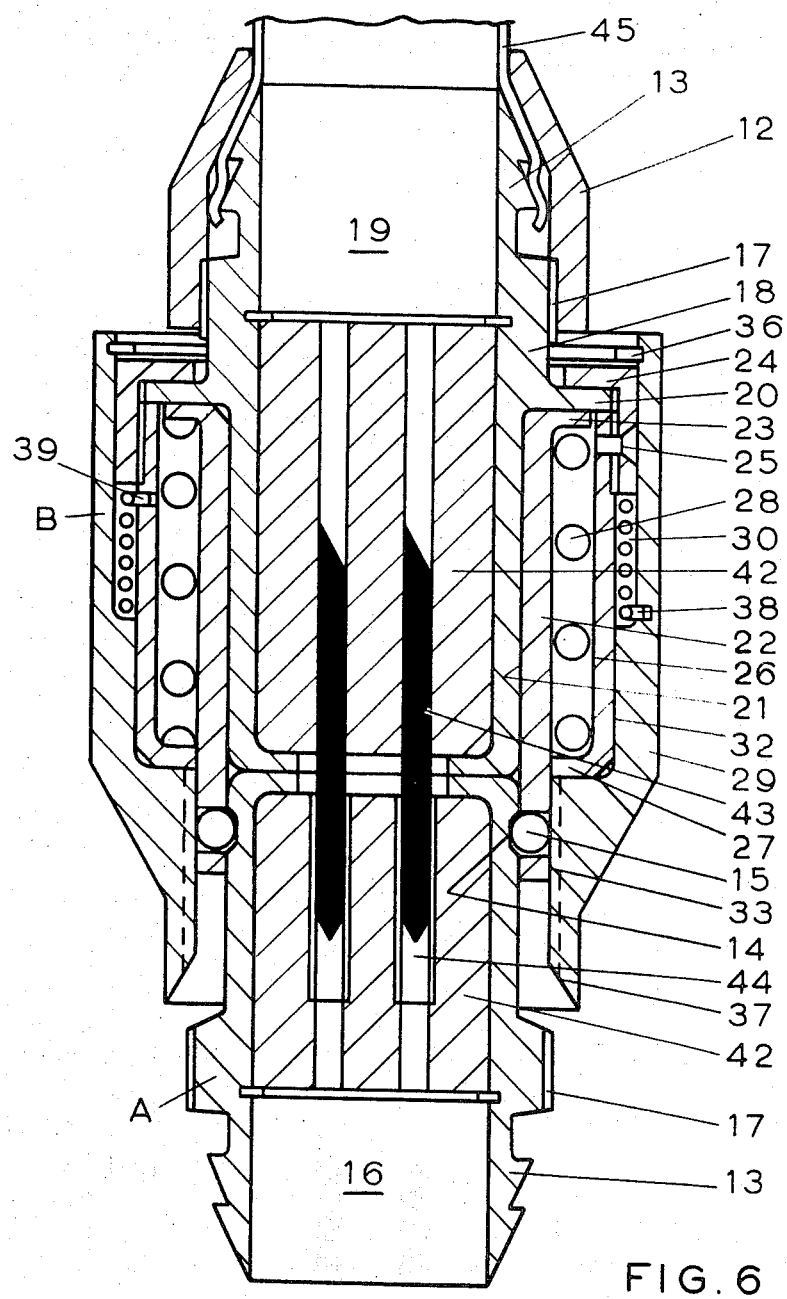
Figure 7:
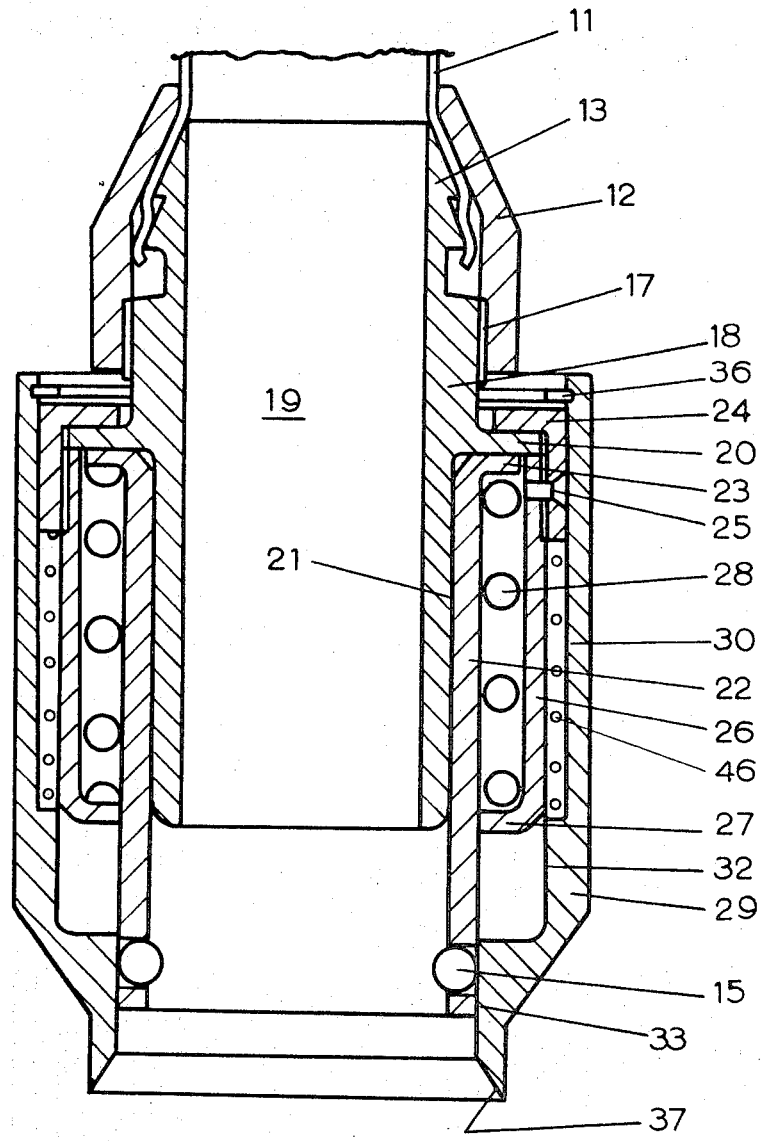

The invention will now be described, by way of example, with reference to the accompanying drawings, in which:

FIG. 1 is a schematic section of a coupling in a preferred embodiment of the invention, FIG. 2 is a section on the lines II — II of FIG. 1 on a different scale, FIG. 3 is a section of the first part of a coupling similar to that shown in FIG. 1 but provided with a valve to seal the bore when the two parts of the coupling are separated, FIG. 4 is a section of the second part of a coupling similar to that shown in FIG. 1, but provided with a valve to seal the bore when the two parts of the coupling are separated, FIG. 5 is a section of the two parts shown in FIGS. 3 and 4 coupled together, FIG. 6 is a section of a coupling similar to that shown in FIG. 1 but adapted to connect electrical conductors, and FIG. 7 is a section of the second part of a coupling incorporating two compression springs.

In the preferred embodiment of the invention, as shown in FIGS. 1 to 6, the coupling is separated manually against a first spring force and automatically on axial overload by a second spring force, the first spring force being a torsional force supplied by a torsion spring and the second spring force being a compressive force supplied by a compression spring.

Referring to FIGS. 1 and 2, the coupling consists of a first part "A" and a second part "B," each part being adapted at the end remote from the interface between the parts to be connected to the units being joined by any suitable arrangement. For example, the part B, in FIGS. 1, 4 and 5, is shown with a pipe 11 gripped between a conical ring nut 12 screwed on a threaded portion 17 and a serrated portion 13.

Similarly, the first part A has a serrated portion 13 and a screw thread 17 for a conical ring nut.

On the external surface of the part A, near its interface end, there is a circumferential groove 14 to accommodate balls 15 which act as detents. Part A has a central bore 16 for the passage of liquid or gas.

The second part B has a body 18 with bore 19. The external surface of the body 18 has a flange 20 and a parallel portion 21.

A cylinder 22 is arranged to slide axially on the parallel portion 21 of the body 18. This cylinder 22 includes a cage to hold the balls 15 captive and has a shoulder 23.

Secured to the flange 20 of the body 18 by a ring nut 24 and a locking screw 25 is a tubular member 26 with an inwardly facing shoulder 27. Compressed between the shoulder 23 on the cylinder 22 and the inwardly facing shoulder 27 on the tubular member 26 is a compression spring 28.

Surrounding the tubular member 26 and the cylinder 22 is a sleeve 29. The sleeve 29 includes three different internal diameter portions. The largest internal diameter portion 30 provides a location for a torsion spring 31 and the ring nut 24. The medium internal diameter portion 32 of the sleeve 29 locates the sleeve in relation to the tubular member 26, and has a fit which allows rotary movement on the tubular member 26. The smallest internal diameter portion 33 of the sleeve 29 incorporates broad faced splines 34 (FIG. 2) which urge the balls 15 into the circumferential groove 14 on the external surface of part A of the coupling. Between the broad faced splines 34 are recesses 35 of sufficient depth so that, when the recesses are adjacent to the balls 15, the balls 15 are allowed to ride out of the circumferential groove 14. The sleeve 29 is located on part B of the coupling between the inwardly facing shoulder 27 on the tubular member 26 and a circlip 36 which abuts the ring nut 24. Th end of the sleeve 29 at the small diameter portion is flared to provide a lead 37 for engaging the balls 15 when the two parts of the coupling are brought together.

Rotary movement of the sleeve 29 is controlled by the torsion spring 31 between a "locked" position in which the broad faced splines 34 are in co-operation with the balls 15 and a "free" position in which the recesses 35 are in co-operation with the balls 15. The torsion spring 31 has on one end a tongue 38 which engages in a hole in the sleeve 29 and on the other end a tongue 39 which engages in the tubular member 26. The extent of rotational movement of the sleeve 29 is governed by stops (not shown).

To ensure positive relative movement between the balls 15 and the sleeve 29 between the "locked" and the "free" positions, no relative rotational movement between the cylinder 22 and the body 18 is permissible. Thus, a mechanical arrangement which allows axial but does not allow rotational movement between these two items, for example, splines or a pin working in a slot, is provided.

In operation, when it is desired to connect the two halves of the coupling, the sleeve 29 is rotated manually against the action of the torsion spring 31 to the "free" position, the two parts of the coupling are moved together axially and the sleeve is released. The action of the torsion spring 31 rotates the sleeve 29 to the "locked" position where the broad faced splines 34 hold the balls 15 in the circumferential groove 14. To separate the coupling manually the sleeve 29 is rotated to the "free" position, the balls 15 are released from the circumferential groove 14 and the two parts are separated.

When the connected coupling is subjected to an axial load tending to draw the parts apart the load in the second part "B" is transferred by way of the tubular member 26 and the inwardly facing shoulder 27 to the compression spring 28. The cylinder 22 is held to the first part A of the coupling by the balls 15 so that the compression spring 28 is compressed between the shoulder 23 on the cylinder 22 and the inwardly facing shoulder 27 on the tubular member 26. As the spring 28 is compressed the broad faced splines 34 move axially until, when a force selected by a predetermined strength of the spring 28 moves the sleeve 29 an amount to allow the balls 15 to become free, the parts of the coupling separate.

FIGS. 3, 4 and 5 illustrate a coupling similar to that shown in FIGS. 1 and 2, but with the bores 16 and 19 of the first part and the second part of the coupling respectively, provided with spring loaded sealing valves 40 arranged to open automatically when the two parts of the coupling are connected, as shown in FIG. 5, and to close automatically when the two parts of the coupling separate (FIGS. 3 and 4). The coupling may also be provided with a sealing ring 41 to minimise fluid loss.

The coupling illustrated in FIG. 6 is again similar to that shown in FIG. 1, but is adapted to connect electrical conductors. Insulated blocks 42 are arranged in the bores 16 and 19. The insulated blocks 42 carry a plurality of corresponding pin terminals 43 and socket terminals 44, the terminals being connected to conductors (not shown), which form part of an electrical cable (not shown) carried in a conduit 45.

In the coupling shown in FIG. 7, the first and second spring forces are compressive forces supplied by first and second compression springs 46 and 28 respectively. In FIG. 7, which illustrates only the second part B of the coupling, the sleeve 29 is arranged to be moved manually in an axial direction in relation to the first part A (not shown, but which would be the same as that described with reference to FIG. 1) between a "free" retracted position, and a "locked" extended position. The first compression spring 46 moves the sleeve to the "locked" position. In the "locked" position the smallest internal diameter 33 of the sleeve 29 holds the balls 15 in the circumferential groove 14 of the first part A (not shown) of the coupling. When the sleeve 29 is moved axially to the "free" position the smallest internal diameter 33 is clear of the balls 15, permitting their disengagement from the circumferential groove 14. When disconnection of the two parts of the coupling takes place due to axial overload, the load in the first part A (not shown) is transferred by way of the detents 15 and the cylinder 22 to one end of the second compression spring 28. The load in the second part B is transferred by way of the ring nut 24 and the tubular member 26 to the other end of the second compression spring 28. As the spring 28 is compressed the cylinder 22 and detents 15 move in relation to the sleeve 29 until the detents reach a position adjacent to the lead-in 37 of the sleeve 29, when the detents are released and the two parts of the coupling separate.

Alternatively, the sleeve may have an internal recess in the smallest internal diameter portion, and may be arranged to be moved towards the interface of the two halves of the coupling, so that the recess is aligned with the balls and allows the coupling to be separated. Thus in this alternative the "free" position of the sleeve is when it is extended, and the "locked" position of the sleeve is when it is retracted.

In a third embodiment of the invention (not shown), the first spring force is a torsional force and the second spring force is a compressive force, the two forces being supplied by one spring. A coupling having this arrangement would be similar to that shown in FIG. 1, except that the torsion spring 31 would be omitted and the compression spring 28 would be wound so that it was stiffer in compression than in torsion. One of the free ends of the spring 28 would be fixed to the cylinder 22 and the other free end would be fixed through the tubular member 26 to the sleeve 29. Thus the spring 28 would act as a torsion spring when the sleeve 29 was twisted manually and as a compression spring when subjected to axial load passing through the cylinder 22 and tubular member 26. The detents would otherwise be released as previously described in conjunction with the coupling shown in FIG. 1.

We claim as our invention:

1. A coupling for joining two units, the coupling including a first part and a second part attached respectively to the units to be joined, each part having a bore arranged to provide a path from one unit to the other unit, the first part and the second part being retained in coupled relationship by detents held captive within the second part and urged, in the coupled position, radially inwards into at least one recess on the external surface of the first part by a sleeve carried by and capable of movement on the second part, wherein the sleeve is arranged for movement on the second part against a first, compression, spring for automatic uncoupling on axial overload and against a second, torsion, spring for manual uncoupling.

2. A coupling as claimed in claim 1 wherein a first mode of movement is axial against said first, compression, spring, and a second mode of movement is rotational against said second, torsion, spring.

* * * * *